(12) United States Patent
Forrest et al.

(10) Patent No.: US 11,359,541 B2
(45) Date of Patent: Jun. 14, 2022

(54) SYSTEMS AND METHODS FOR OXIDATION OF HYDROCARBON GASES

(71) Applicant: 8 RIVERS CAPITAL, LLC, Durham, NC (US)

(72) Inventors: Brock Alan Forrest, Durham, NC (US); Jeremy Eron Fetvedt, Raleigh, NC (US); Peter Michael McGroddy, Durham, NC (US)

(73) Assignee: 8 RIVERS CAPITAL, LLC, Durham, NC (US)

( * ) Notice: Subject to any disclaimer, the term of this patent is extended or adjusted under 35 U.S.C. 154(b) by 1078 days.

(21) Appl. No.: 15/492,376

(22) Filed: Apr. 20, 2017

(65) Prior Publication Data

US 2017/0306844 A1    Oct. 26, 2017

Related U.S. Application Data

(60) Provisional application No. 62/325,752, filed on Apr. 21, 2016.

(51) Int. Cl.
*F02C 3/34* (2006.01)
*F01K 25/10* (2006.01)
(Continued)

(52) U.S. Cl.
CPC .................. *F02C 3/34* (2013.01); *F01K 7/16* (2013.01); *F01K 25/103* (2013.01); *F02C 1/04* (2013.01);
(Continued)

(58) Field of Classification Search
CPC .. F02C 3/34; F02C 3/30; F01K 25/103; F01K 7/16; F05D 2240/35; F05D 2260/20
See application file for complete search history.

(56) References Cited

U.S. PATENT DOCUMENTS

| 4,498,289 A | 2/1985 | Osgerby |
| 5,345,756 A | 9/1994 | Jahnke et al. |

(Continued)

FOREIGN PATENT DOCUMENTS

| EP | 0831 205 | 3/1998 |
| GB | 2484080 | 4/2012 |

(Continued)

OTHER PUBLICATIONS

E.I. Yantovskii et al. , "Computer Exergonomics of Power Plants Without Exhaust Gases," Energy Convers. Mgmt., Publ. 1992, vol. 33, No. 5-8, pp. 405-412.

(Continued)

*Primary Examiner* — Ehud Gartenberg
*Assistant Examiner* — Henry Ng
(74) *Attorney, Agent, or Firm* — Womble Bond Dickinson (US) LLP (57) ABSTRACT

The present disclosure relates to systems and methods wherein a dilute hydrocarbon stream can be oxidized to impart added energy to a power production system. The oxidation can be carried out without substantial combustion of the hydrocarbons. In this manner, dilute hydrocarbon streams that would otherwise be required to undergo costly separation processes can be efficiently utilized for improving the power production system and method. Such systems and methods particularly can utilize dilute hydrocarbon stream including a significant amount of carbon dioxide, such as may be produced in hydrocarbon recovery process, such as enhanced oil recovery or conventional hydrocarbon recovery processes.

26 Claims, 7 Drawing Sheets

(51) Int. Cl.
*F02C 1/04* (2006.01)
*F02C 7/10* (2006.01)
*F01K 7/16* (2006.01)
*F02C 3/30* (2006.01)

(52) U.S. Cl.
CPC .................. *F02C 3/30* (2013.01); *F02C 7/10* (2013.01); *F05D 2240/35* (2013.01); *F05D 2260/20* (2013.01); *F05D 2260/61* (2013.01)

(56) References Cited

U.S. PATENT DOCUMENTS

| | | | |
|---|---|---|---|
| 5,724,805 A | 3/1998 | Golomb et al. | |
| 6,170,264 B1 | 1/2001 | Viteri et al. | |
| 6,196,000 B1 | 3/2001 | Fassbender | |
| 6,269,624 B1 | 8/2001 | Frutschi et al. | |
| 6,389,814 B2 | 5/2002 | Viteri et al. | |
| 6,598,398 B2 | 7/2003 | Viteri et al. | |
| 6,622,470 B2 | 9/2003 | Viteri et al. | |
| 6,637,183 B2 | 10/2003 | Viteri et al. | |
| 6,684,643 B2 | 2/2004 | Frutschi | |
| 6,824,710 B2 | 11/2004 | Viter et al. | |
| 6,871,502 B2 | 3/2005 | Marin et al. | |
| 6,895,760 B2 * | 5/2005 | Kesseli | F02C 3/20 60/723 |
| 6,910,335 B2 | 6/2005 | Viter et al. | |
| 6,918,253 B2 | 7/2005 | Fassbender | |
| 6,945,029 B2 | 9/2005 | Viteri | |
| 6,945,052 B2 | 9/2005 | Frutschi et al. | |
| 7,021,063 B2 | 4/2006 | Viteri | |
| 7,043,920 B2 | 5/2006 | Viteri et al. | |
| 7,089,743 B2 | 8/2006 | Frutschi et al. | |
| 7,640,739 B2 * | 1/2010 | White | B01D 53/02 60/517 |
| 8,596,075 B2 | 12/2013 | Allam et al. | |
| 8,776,532 B2 | 7/2014 | Allam et al. | |
| 8,986,002 B2 | 3/2015 | Palmer et al. | |
| 9,068,743 B2 | 6/2015 | Palmer et al. | |
| 2002/0134085 A1 | 9/2002 | Frutschi | |
| 2010/0300063 A1 | 12/2010 | Palmer et al. | |
| 2011/0127773 A1 | 6/2011 | Freund et al. | |
| 2011/0179799 A1 | 7/2011 | Allam et al. | |
| 2012/0067054 A1 | 3/2012 | Palmer et al. | |
| 2012/0067056 A1 | 3/2012 | Palmer et al. | |
| 2012/0073261 A1 | 3/2012 | Palmer et al. | |
| 2012/0090352 A1 * | 4/2012 | Brun | F01K 25/103 62/617 |
| 2012/0237881 A1 | 9/2012 | Allam et al. | |
| 2013/0104525 A1 | 5/2013 | Allam et al. | |
| 2013/0104563 A1 | 5/2013 | Oelfke et al. | |
| 2013/0118145 A1 | 5/2013 | Palmer et al. | |
| 2013/0205746 A1 | 8/2013 | Allam et al. | |
| 2013/0236371 A1 * | 9/2013 | Maslov | F02C 3/20 422/198 |
| 2013/0247570 A1 * | 9/2013 | Lehar | F01K 7/42 60/643 |
| 2014/0013766 A1 | 1/2014 | Mittricker et al. | |
| 2014/0083109 A1 | 3/2014 | Oelfke et al. | |
| 2015/0020497 A1 * | 1/2015 | Iwai | F02C 3/34 60/39.23 |
| 2018/0340454 A1 * | 11/2018 | Smogorzewski | F02C 1/08 |

FOREIGN PATENT DOCUMENTS

| | | |
|---|---|---|
| JP | 2010180868 | 8/2010 |
| JP | 2014163243 | 9/2014 |

OTHER PUBLICATIONS

Hong et al., "Analysis of Oxy-Fuel Combustion Power Cycle Utilizing a Pressurized Coal Combustor," *Energy*, Available Online Jun. 21, 2009, pp. 1332-1340, vol. 34, No. 9.

Iantovski et al., "Highly Efficient Zero Emission CO2-Based Power Plant" *Energy Convers. Mgmt*, 1997, Suppl. pp. S141-S146, vol. 38.

Mathieu et al., "Sensitivity Analysis of the MATIANT Cycle," *Energy Conversion & Management*, 1999, pp. 1687-1700, vol. 40.

\* cited by examiner

SYSTEMS AND METHODS FOR OXIDATION OF HYDROCARBON GASES

FIELD OF THE DISCLOSURE

The present disclosure relates to systems and methods whereby various gas streams may be oxidized for energy production. A gas stream more particularly may include hydrocarbons and one or more diluents. Energy produced via oxidation may be imparted, for example, to a power production system or method.

BACKGROUND

Many industrial processes result in gaseous streams that include a content of hydrocarbon materials that are combustible. In many instances, such streams may include hydrocarbons as well as one or more further material that may be considered to contaminate or otherwise dilute the hydrocarbons and thus limit their usefulness. Carbon dioxide is an example of a further material that is frequently found comingled with hydrocarbon gases, particularly in various aspects of the petroleum industry. For example, raw natural gas produced from geologic formations often includes a significant content of carbon dioxide. Conversely, carbon dioxide withdrawn from geologic formations often includes a significant content of hydrocarbon gases. Still further, production gases that are recovered in enhanced oil recovery (EOR) methods often comprise a mixture of hydrocarbon gases and carbon dioxide.

Combination gas streams, such as the examples noted above, typically require specific processing in order to separate the components—i.e., to provide a substantially pure hydrocarbon stream that may be suitable for combustion and/or to provide a substantially pure carbon dioxide stream that may be suitable for use in EOR, or sequestration, or for other end uses. It thus would be useful to have further options for utilizing hydrocarbon-containing streams.

SUMMARY OF THE DISCLOSURE

In one or more embodiments, the present disclosure can provide systems and methods useful for power production. In particular, the systems and methods can be configured for processing of a dilute hydrocarbon stream such that the hydrocarbons in the stream are oxidized without substantial combustion and thusly impart added energy to the power production cycle.

In one or more embodiments, the present disclosure can provide a method for power production comprising:
  combusting a carbonaceous fuel with oxygen in a combustor in the presence of a recycle $CO_2$ stream to form a combustion product stream comprising $CO_2$;
  expanding the combustion product stream in a turbine to produce power and form a turbine exhaust stream;
  cooling the turbine exhaust stream in a recuperator heat exchanger;
  removing any water present from the cooled turbine exhaust stream to form the recycle $CO_2$ stream;
  compressing at least a portion of the recycle $CO_2$ stream;
  optionally diverting a portion of the recycle $CO_2$ stream and combining the diverted portion with the oxygen prior to said combusting;
  passing the compressed recycle $CO_2$ stream back through the recuperator heat exchanger such that the compressed recycle $CO_2$ stream is heated with heat withdrawn from the turbine exhaust stream;
  inputting a dilute hydrocarbon stream under conditions wherein the hydrocarbons in the dilute hydrocarbon stream are oxidized without substantial combustion; and
  directing the heated, compressed recycle $CO_2$ stream to the combustor.

In one or more further embodiments, the method for power production can be further defined in relation to one or more of the following statements, which can be combined in any number and order.

The dilute hydrocarbon stream can be input such that the hydrocarbons are oxidized within the recuperator heat exchanger or a further heat exchanger configured for heat exchange with one or both of the recycle $CO_2$ stream and the oxygen.

The dilute hydrocarbon stream can be combined with the compressed recycle $CO_2$ stream before said passing step.

The dilute hydrocarbon stream can be combined with the compressed recycle $CO_2$ stream in the recuperator heat exchanger.

The dilute hydrocarbon stream can be combined with the compressed recycle $CO_2$ stream in a further heat exchanger.

A portion of the recycle $CO_2$ stream can be diverted and combined with the oxygen to form a diluted oxygen stream, and the dilute hydrocarbon stream can be combined with the diluted oxygen stream.

The diluted oxygen stream combined with the dilute hydrocarbon stream can be passed through the recuperator heat exchanger or a further heat exchanger wherein the hydrocarbons in the dilute hydrocarbon stream are oxidized.

The dilute hydrocarbon gas is a product of an enhanced oil recovery process.

In one or more embodiments, the present disclosure can provide a method for power production comprising:
  carrying out a closed or semi-closed Brayton cycle wherein:
    $CO_2$ is used as a working fluid;
    a carbonaceous fuel is used as a first fuel source and is combusted to heat the working fluid; and
    a recuperator heat exchanger is used to re-capture heat of combustion; and
  adding a dilute hydrocarbon stream to the closed or semi-closed Brayton cycle as a second fuel source, wherein hydrocarbons in the dilute hydrocarbon stream are oxidized without substantial combustion to provide additional heat.

In one or more embodiments, the present disclosure can provide a method for processing of a waste stream comprising:
  providing a waste stream comprising one or more hydrocarbons and one or more diluents;
  inputting the waste stream into a closed or semi-closed Brayton cycle such that the hydrocarbons in the waste stream are oxidized without substantial combustion.

In one or more embodiments, a method for power production can comprise carrying out a closed or semi-closed power production cycle wherein: $CO_2$ is circulated as a working fluid that is repeatedly compressed and expanded for power production; a first fuel source is combusted in a combustor to heat the working fluid after the working fluid is compressed and before the working fluid is expanded for power production; and a recuperator heat exchanger is used to re-capture heat of combustion for heating of the working fluid. The method further can comprise heating the working fluid with heat that is formed outside of the combustor using a second fuel source, said heating being in addition to the re-captured heat of combustion, and said second fuel source being a dilute hydrocarbon stream that is oxidized without substantial combustion to provide the heat that is formed outside of the combustor.

In one or more further embodiments, the method for power production can be further defined in relation to one or more of the following statements, which can be combined in any number and order.

The concentration of hydrocarbons in the dilute hydrocarbon stream can be below the lower explosive limit (LEL) of the hydrocarbons.

Hydrocarbons in the dilute hydrocarbon stream can be catalytically oxidized.

The method particularly can comprise the following steps: the first fuel is combusted with oxygen in the combustor in the presence of the $CO_2$ working fluid to form an exhaust stream; the exhaust stream from the combustor is expanded in a turbine to produce power and form a turbine exhaust stream; the turbine exhaust stream is cooled in the recuperator heat exchanger; the turbine exhaust stream exiting the recuperator heat exchanger is purified to remove at least water from the working fluid; at least a portion of the working fluid is compressed in a compressor; at least a portion of the compressed working fluid is passed back through the recuperator heat exchanger such that the compressed working fluid is heated with heat withdrawn from the turbine exhaust stream; and the heated, compressed working fluid is recirculated to the combustor.

The dilute hydrocarbon stream can be added to the working fluid after the working fluid is compressed in the compressor and before the working fluid is passed back through the recuperator heat exchanger.

The hydrocarbons in the dilute hydrocarbon stream can be oxidized within the recuperator heat exchanger.

The hydrocarbons in the dilute hydrocarbon stream can be oxidized in a further heat exchanger configured for heat exchange with one or both of the working fluid and an oxygen stream providing the oxygen to the combustor.

The dilute hydrocarbon stream can be combined with the compressed working fluid in the recuperator heat exchanger.

A portion of the compressed working fluid can be combined with oxygen to form a diluted oxygen stream, and wherein the dilute hydrocarbon stream is combined with the diluted oxygen stream.

The diluted oxygen stream combined with the dilute hydrocarbon stream can be passed through the recuperator heat exchanger wherein the hydrocarbons in the dilute hydrocarbon stream are oxidized.

The diluted oxygen stream combined with the dilute hydrocarbon stream can be passed through a further heat exchanger wherein the hydrocarbons in the dilute hydrocarbon stream are oxidized.

The dilute hydrocarbon stream can be input to an oxidation reactor.

A reaction stream exiting the oxidation reactor can be input to the recuperator heat exchanger.

A reaction stream exiting the oxidation reactor is input to a further turbine for power production.

A portion of the turbine exhaust stream can be input to the oxidation reactor so as to be included in the reaction stream that is input to the further turbine.

The dilute hydrocarbon stream can be a product of an enhanced oil recovery process.

In one or more embodiments, the present disclosure can provide a system for power production comprising:

a power production unit configured for carrying out a closed or semi-closed Brayton cycle, said unit including a combustor configured for combustion of a carbonaceous fuel in the presence of a recycle $CO_2$ stream; and one or more inputs configured for input of a dilute hydrocarbon stream to a component of the unit other than the combustor.

In some embodiments, a power production system can comprise: a power production unit configured for carrying out a closed or semi-closed power production cycle, said power production unit including: a combustor configured for combustion of a first fuel in the presence of a compressed $CO_2$ working fluid; a turbine configured for expanding the compressed $CO_2$ working fluid to provide an expanded $CO_2$ working fluid; a compressor configured for compressing the expanded $CO_2$ working fluid to provide the compressed $CO_2$ working fluid; a recuperator heat exchanger configured for transferring heat from the expanded $CO_2$ working fluid leaving the turbine to the compressed $CO_2$ working fluid leaving the compressor; and one or more inputs configured for input of a dilute hydrocarbon stream to a component of the power production unit other than the combustor.

In one or more further embodiments, the power production system can be further defined in relation to one or more of the following statements, which can be combined in any number and order.

The input can be configured for input of the dilute hydrocarbon stream into the recuperator heat exchanger.

The power production system can further comprise a second heat exchanger, and the input can be configured for input of the dilute hydrocarbon stream into the second heat exchanger.

The input can be configured for input of the dilute hydrocarbon stream into a line comprising the $CO_2$ working fluid.

The input can be configured for input of the dilute hydrocarbon stream into the line downstream of the recuperator heat exchanger and upstream of the compressor.

The power production system further can comprise an oxidation reactor, and the input can be configured for input of the dilute hydrocarbon stream into the oxidation reactor.

The oxidation reactor can be a catalytic oxidation reactor.

The oxidation reactor can be configured for output of a reaction stream that is input to the recuperator heat exchanger.

The oxidation reactor can be configured for receiving a portion of the expanded $CO_2$ working fluid upstream of the recuperator heat exchanger.

The power production system further can comprise a second turbine configured for receiving a reaction stream from the oxidation reactor.

BRIEF SUMMARY OF THE FIGURES

Having thus described the disclosure in the foregoing general terms, reference will now be made to accompanying drawings, which are not necessarily drawn to scale, and wherein:

DETAILED DESCRIPTION

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art. As used in this specification and the claims, the singular forms "a," "an," and "the" include plural referents unless the context clearly dictates otherwise.

In one or more embodiments, the present disclosure provides systems and methods for power production wherein a dilute hydrocarbon stream is oxidized without substantial combustion to add energy for power production. The systems and methods allow for low cost, efficient utilization of streams that would otherwise be required to undergo expensive and time-consuming separation to provide useful materials (e.g., a purified stream of the hydrocarbons and/or a purified stream of one or more diluents).

A dilute hydrocarbon stream as used herein is understood to mean a stream that comprises greater than trace amounts of one or more hydrocarbons and at least one diluent. The dilute hydrocarbon stream can comprise a concentration of hydrocarbons that is suitable to provide the desired level of heating via oxidation of the hydrocarbons. The concentration of the hydrocarbons in the dilute hydrocarbon stream is limited only in that the dilute hydrocarbon stream comprises hydrocarbons in an amount that is below the lower explosive limit (LEL). In particular, the dilute hydrocarbon concentration in the stream can be below the LEL after the dilute hydrocarbon is mixed with a recycle $CO_2$ stream as further described herein.

A hydrocarbon present in the dilute hydrocarbon stream preferably is in a gaseous state. Non-limiting examples of hydrocarbons that may be present include $C_1$ to $C_{10}$ compounds. Preferably, the dilute hydrocarbon stream comprises $C_1$ to $C_4$ compounds; however, $C_5$ to $C_{10}$ compounds may be present, particularly when the dilute hydrocarbon stream will be subject to pressurization. In specific embodiments, the dilute hydrocarbon stream comprises at least methane. In some embodiments, the dilute hydrocarbon stream comprises natural gas.

A diluent present in the dilute hydrocarbon stream can be any material that serves to dilute the hydrocarbon concentration to be within the range noted above. In specific embodiments, the diluent can comprise $CO_2$. Other non-limiting examples of diluents that may be present include nitrogen, water, $H_2S$, and oxygen. In some embodiments, the diluent can comprise predominately $CO_2$ (i.e., greater than 50% by volume of the diluent being $CO_2$), and the diluent specifically can comprise about 60% by volume or greater, about 75% by volume or greater, about 80% by volume or greater, about 90% by volume or greater, about 95% by volume or greater, about 98% by volume or greater, about 99% by volume or greater, about 99.5% by volume or greater, or about 99.8% by volume or greater $CO_2$. For example, the diluent can comprise about 60% by volume to about 99.9% by volume, about 75% by volume to about 99.8% by volume, or about 80% by volume to about 99.5% by volume $CO_2$.

The dilute hydrocarbon stream can come from any source, including industrial waste, reaction products, hydrocarbon production streams (e.g., from a natural gas well or oil well) and the like. If desired, a hydrocarbon stream from such source can be specifically diluted through addition of $CO_2$ (or other diluent) to the hydrocarbon stream. For example, a waste stream can comprise hydrocarbons in a concentration above the LEL, and such stream may be used according to the present disclosure through addition of further diluent. Further to the above, $CO_2$ withdrawn from natural formations often include a content of natural gas or other mixture of gaseous hydrocarbons. In some embodiments, a dilute hydrocarbon stream can arise from enhanced oil recovery (EOR), such as in methods described in U.S. Pat. No. 8,869,889 to Palmer et al., the disclosure of which is incorporated herein by reference. EOR methods typically result in a production stream comprising a mixture of materials that must be separated to provide useable streams of substantially pure materials. When $CO_2$ is used in EOR, the produced materials specifically must be treated to separate $CO_2$ from the hydrocarbon products. In the aforementioned patent to Palmer et al., a mixture of $CO_2$ and hydrocarbons may be used as part of the fuel source in an associated power production method. In such methods, the combined $CO_2$ and hydrocarbon mixture is directed to a combustor where it is combusted, typically along with a stream of substantially pure hydrocarbon fuel. Such method requires a purpose-built combustor capable of combusting lower BTU-content fuels, is limited to using only streams with a specified hydrocarbon centration (in order to maintain flame stability in the combustor), and is limited in the total flowrate of $CO_2$-rich hydrocarbons that can be processed in a single plant. Further, because the relative concentrations of the components of such stream of $CO_2$ and gaseous hydrocarbons from EOR can undergo significant fluctuations, such methods are hindered in that it is difficult to achieve a substantially constant flame temperature in the combustor.

Currently, significant energy and expense is required to separate hydrocarbons from $CO_2$. In the case of raw natural gas production, the dilute hydrocarbons produced from the field are typically dried, distilled to remove longer chain hydrocarbons (natural gas liquids, or NGLs), sweetened via removal of $H_2S$ and other impurities, and sent through an absorber tower to scrub out the $CO_2$. The cleaned natural gas is then sent into the pipeline for downstream consumption, such as by power production, and the clean $CO_2$ is vented, sequestered, and/or utilized (e.g., for further EOR). When $CO_2$ is used for EOR, the portion of the injected $CO_2$ that is produced along with the produced oil often contains a small amount of gaseous hydrocarbons that must be separated in order to enable reinjection of the $CO_2$ into the formation. This $CO_2$-rich hydrocarbon gas must be separated from produced oil and similarly dried and distilled to remove any NGLs. This gas must then be recompressed for reinjection into the field. These processes require a large amount of energy and consumables, leading to high capital expenses and operating expenses for the process.

The systems and methods of the present disclosure allow for low cost, efficient use of dilute hydrocarbon streams to add energy to existing power production systems and methods. For example, the dilute hydrocarbon streams can be input to a system and method wherein a carbonaceous fuel is combusted to produce heat to a stream that may or may not be pressurized above ambient pressure. The dilute hydrocarbon stream likewise can be applied to one or more systems wherein a working fluid is circulated for being repeatedly heated and cooled and/or for being repeatedly pressurized and expanded. Such working fluid can comprise one or more of $H_2O$, $CO_2$, and $N_2$, for example.

The systems and methods of the present disclosure can overcome problems in the field by extracting the heating value of the entrained hydrocarbons of a dilute hydrocarbon stream without combustion. Instead, the inherent conditions of the high temperature power production systems and methods can be utilized to facilitate thermal oxidation of these hydrocarbons in the dilute hydrocarbon stream. For example, oxidation can occur in a heat exchanger. This allows the existing power cycles to utilize these dilute hydrocarbon streams with minimal modification of the process, to utilize significantly higher flow rates of these streams, and to simplify the overall cycle by eliminating certain equipment and the need for external sources of heat.

Utilization of $CO_2$ (particularly in supercritical form) as a working fluid in power production has been shown to be a highly efficient method for power production. See, for example, U.S. Pat. No. 8,596,075 to Allam et al., the disclosure being incorporated herein by reference, which describes the use of a directly heated $CO_2$ working fluid in a recuperated oxy-fuel Brayton cycle power generation system with virtually zero emission of any streams to the atmosphere. It has previously been proposed that $CO_2$ may be utilized as a working fluid in a closed cycle wherein the $CO_2$ is repeatedly compressed and expanded for power production with intermediate heating using an indirect heating source and one or more heat exchangers. See, for example, U.S. Pat. No. 8,783,034 to Held, the disclosure of which is incorporated herein by reference. Thus, in some embodiments, the dilute hydrocarbon stream can be used an input to a closed or semi-closed Brayton cycle to increase the efficiency of power production via such cycle.

Further examples of power production systems and methods wherein a dilute hydrocarbon stream as described herein can be used are disclosed in U.S. Pat. No. 9,068,743 to Palmer et al., U.S. Pat. No. 9,062,608 to Allam et al., U.S. Pat. No. 8,986,002 to Palmer et al., U.S. Pat. No. 8,959,887 to Allam et al., U.S. Pat. No. 8,869,889 to Palmer et al., and U.S. Pat. No. 8,776,532 to Allam et al., the disclosures of which are incorporated herein by reference. As a non-limiting example, a power production system with which a dilute hydrocarbon stream may be used can be configured for combusting a fuel with $O_2$ in the presence of a $CO_2$ circulating fluid in a combustor, preferably wherein the $CO_2$ is introduced at a pressure of at least about 12 MPa (e.g., about 12 MPa to about 60 MPa) and a temperature of at least about 400° C. (e.g., about 400° C. to about 1,200° C.), to provide a combustion product stream comprising $CO_2$, preferably wherein the combustion product stream has a temperature of at least about 800° C. (e.g., about 1,500° C.). Such power production system further can be characterized by one or more of the following:

The combustion product stream can be expanded across a turbine with a discharge pressure of about 1 MPa or greater (e.g., about 1 MPa to about 7.5 MPa) to generate power and provide a turbine discharge steam comprising $CO_2$.

The turbine discharge stream can be passed through a recuperator heat exchanger unit to provide a cooled discharge stream.

The cooled turbine discharge stream can be processed to remove one or more secondary components other than $CO_2$ (particularly any water present and/or $SO_x$ and/or $NO_x$) to provide a purified discharge stream, which particularly may be a recycle $CO_2$ stream.

The recycle $CO_2$ stream can be compressed, particularly to a pressure wherein the $CO_2$ is supercritical.

The supercritical $CO_2$ can be cooled to increase the density (preferably to at least about 200 kg/m$^3$) of the recycle $CO_2$ stream.

The high density recycle $CO_2$ stream can be pumped to a pressure suitable for input to the combustor (e.g., as noted above).

The pressurized recycle $CO_2$ stream can be heated by passing through the recuperator heat exchanger unit using heat recuperated from the turbine discharge stream.

All or a portion of the pressurized recycle $CO_2$ stream can be further heated with heat that is not withdrawn from the turbine discharge stream (preferably wherein the further heating is provided one or more of prior to, during, or after passing through the recuperator heat exchanger) prior to recycling into the combustor.

The heated pressurized recycle $CO_2$ stream can be passed into the combustor.

In one or more embodiments, a power production system suitable for input of a dilute hydrocarbon stream as described herein can be configured for heating via methods other than through combustion of a carbonaceous fuel (or in addition to combustion of a carbonaceous fuel). As one non-limiting example, solar power can be used to supplement or replace the heat input derived from the combustion of a carbonaceous fuel in a combustor. Other heating means likewise can be used. In some embodiments, any form of heat input into a $CO_2$ recycle stream at a temperature of 400° C. or less can be used. For example, condensing steam, gas turbine exhaust, adiabatically compressed gas streams, and/or other hot fluid streams which can be above 400° C. may be utilized.

Figure 1:
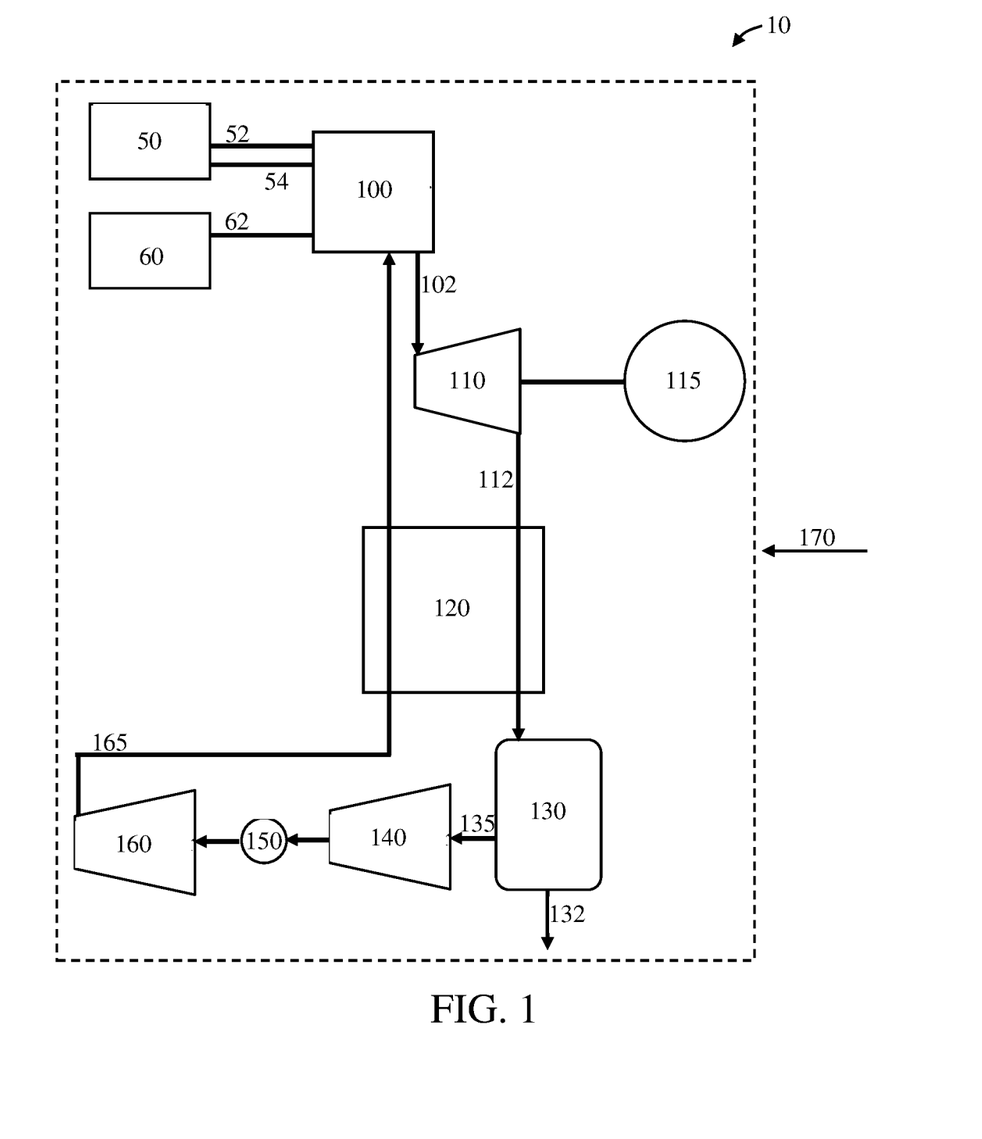
FIG. 1 is a flow diagram for a power production plant according to embodiments of the present disclosure wherein a dilute hydrocarbon stream can be input to various elements of the power production plant.

In one or more embodiments, a power production plant may include some combination of the elements shown in FIG. 1 (although it is understood that further elements may also be included). As seen therein, a power production plant 10 (or power production unit) can include a combustor 100 configured to receive fuel from a fuel supply 50 (e.g., a carbonaceous fuel) and oxidant from an oxidant supply 60 (e.g., an air separation unit or plant (ASU) producing substantially pure oxygen). A plurality of fuel supply lines (52, 54) are illustrated; however, only a single fuel supply line may be used, or more than two fuel supply lines may be used. Likewise, while only a single oxidant line 62 is illustrated, a plurality of oxidant lines may be used. The fuel is combusted in the combustor with the oxidant in the presence of a recycle $CO_2$ stream. The combustion product stream in line 102 is expanded across a turbine 110 to produce power with a combined generator 115. Although the combustor 100 and turbine 110 are illustrated as separate elements, it is understood that, in some embodiments, a turbine may be configured so as to be inclusive of the combustor. In other words, a single turbine unit may include a combustion section and an expansion section. Accordingly, discussion herein of passage of streams into a combustor may also be read as passage of streams into a turbine that is configured for combustion as well as expansion.

Turbine exhaust in line 112 is cooled in a heat exchanger 120, and water (in line 132) is separated in separator 130 to produce a substantially pure recycle $CO_2$ stream in line 135. If desired, part of the stream of substantially pure $CO_2$ may be withdrawn from the plant and/or diverted to other parts of the plant (e.g., for cooling the turbine). The recycle $CO_2$ stream is compressed in a multi-stage compressor. As illustrated, the multi-stage compressor includes a first stage 140, a second stage 160, and an intercooler 150. Optionally, one or more further compressors or pumps may be added. The compressed recycle $CO_2$ stream in line 165 is passed back through the heat exchanger 120 to the combustor 100. As illustrated (and as further discussed below), a dilute hydrocarbon stream 170 can be introduced into the power production cycle. The stream 170 is shown generally as one or more inputs configured for input of the dilute hydrocarbon stream to a component of the power production unit 10. This is illustrated by the solid arrow on the right margin of FIG. 1. The dilute hydrocarbon stream 170 specifically may be excluded from being input to the combustor 100.

Within the power production cycle as discussed above, the recycle stream in one or both of line 135 and line 165 (consisting of predominantly clean $CO_2$) can be divided into an export $CO_2$ fraction, a diluting $CO_2$ fraction, and a recycle $CO_2$ stream. The ratio of the $CO_2$ divided into the diluting $CO_2$ fraction is determined by what is needed to mix with the substantially pure oxygen from the ASU and provide the combustion oxidant with the desired $O_2/CO_2$ ratio. The dilute hydrocarbon stream 170 can be mixed directly with the recycle $CO_2$ stream (e.g., with the stream in line 135 and/or line 165 and/or a side stream taken from line 135 and/or line 165). The amount of the recycle $CO_2$ stream used in this mixture is sufficient to maintain the necessary mass flow through the recycle circuit and depends on the mass flow of the dilute hydrocarbon stream (this also provides a mechanism to handle changes in the flow rate of the dilute hydrocarbon streams). The remainder of the $CO_2$ from the turbine exhaust stream becomes export $CO_2$ fraction that will be cleaned and sent to a pipeline for downstream utilization or sequestration.

The export $CO_2$ fraction and diluting $CO_2$ fraction streams may be compressed and pumped together in the typical operation of the power cycle (i.e., may be compressed and pumped in any manner of combinations depending on the final use of the export $CO_2$ fraction). In one embodiment, these streams may be sent to a $CO_2$ purification unit (for example, using refrigeration and distillation) to remove excess $O_2$ and any inert materials and generate a stream of high purity $CO_2$ at the desired pressure. The diluting $CO_2$ fraction is then sent to be mixed with incoming $O_2$ to form the high pressure oxidant needed in the combustor. In another embodiment, the diluting $CO_2$ fraction can be sent directly to $O_2$ mixing without this impurity removal being required. The export $CO_2$ fraction is sent to a pipeline for downstream sequestration or utilization.

Figure 2:
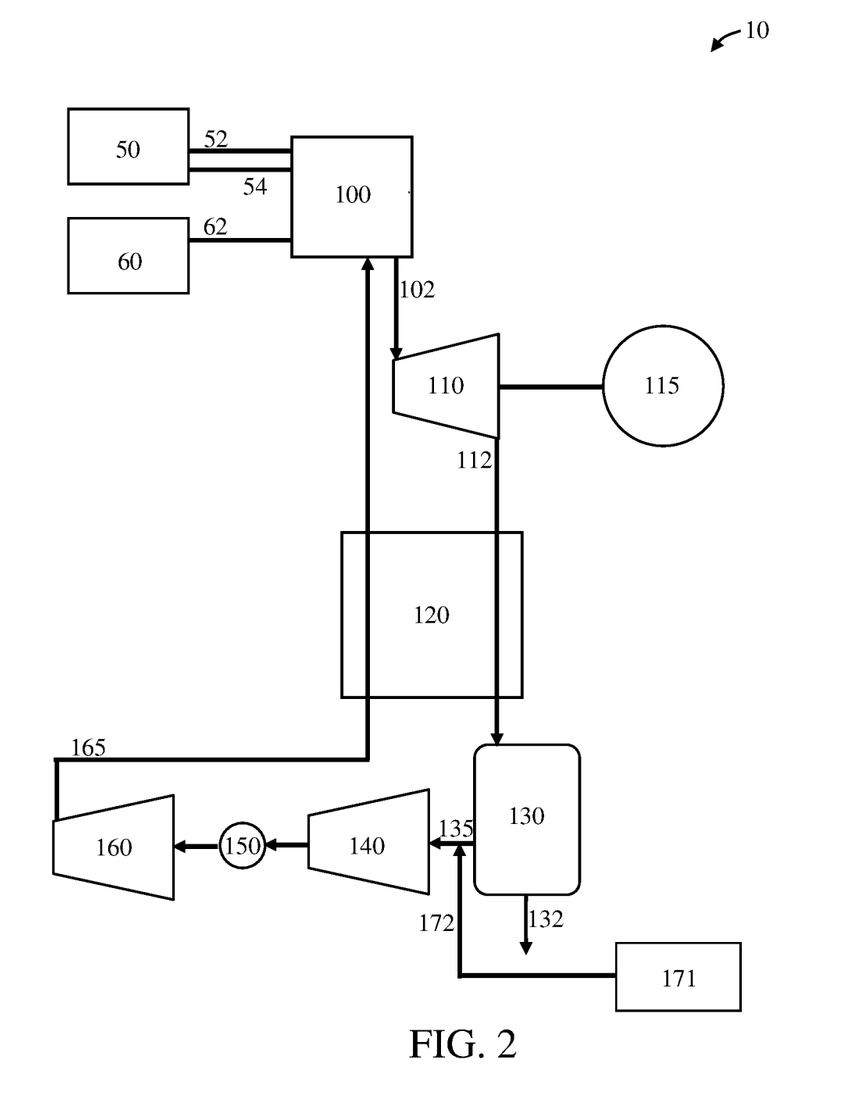
FIG. 2 is a flow diagram for a power production plant according to embodiments of the present disclosure wherein a dilute hydrocarbon stream is input to a recycled working fluid stream.

In one embodiment, the recycle $CO_2$ stream can be mixed with the dilute hydrocarbon stream 170 prior to compression and pumping to the combustor input pressure (e.g., about 300 bar in some embodiments). As illustrated in FIG. 2, a dilute hydrocarbons from hydrocarbon source 171 flows through line 172 and is input to line 135. As such, the dilute hydrocarbon in line 171 is input to the line 135 comprising the recycle $CO_2$ working fluid downstream of the recuperator heat exchanger 120 and upstream of the compressor 140 and/or the compressor 160. This can be done separately from the export $CO_2$ fraction and the diluting $CO_2$ fraction to prevent contamination of these streams by hydrocarbons and other non-$CO_2$ species present in the dilute hydrocarbon stream 170. This can be accomplished using either entirely separate rotating equipment or using separate wheels of the same rotating equipment, as would be feasible in an integrally geared compressor. The mixed dilute hydrocarbon/recycle $CO_2$ stream (now at a pressure of about 300 bar and at a temperature slightly above ambient temperature) is then sent to the primary heat exchanger train 120 to be heated against the turbine exhaust stream in line 112. Unless otherwise indicated, other elements illustrated in FIG. 2 are as described in relation to FIG. 1.

As the stream is heated through the heat exchanger train 120 to a temperature near that of the turbine exhaust, hydrocarbons input via the dilute hydrocarbon stream 170 undergo thermal oxidation without substantial combustion. The thermal oxidation takes place without substantial combustion in that the conditions do not allow for formation of a sustained flame. Thus, the absence of substantial combustion does not necessarily exclude any combustion from occurring, and a small percentage (e.g., less than 5% by volume) of the hydrocarbon compounds provided via the dilute hydrocarbon stream may combust while substantially all (e.g., at least 95% by volume) of the hydrocarbon compounds provided via the dilute hydrocarbon stream instead undergo thermal oxidation. In some embodiments, thermal oxidation may take place in the complete absence of any combustion of the hydrocarbon compounds provided via the dilute hydrocarbon stream. This thermal oxidation may occur in the primary recuperator heat exchanger and/or may occur in a separate heat exchanger that is dedicated to facilitating these reactions. In some embodiments, thermal oxidation can occur within dedicated passages of the recuperator heat exchanger.

These oxidation reactions are enabled by the fact that the power cycle combustor operates with an excess of $O_2$, leading to residual $O_2$ being present in the recycle $CO_2$ stream at a substantially small concentration but at a high partial pressure. For example, the recycle $CO_2$ stream in line 135 and/or line 165 may have an $O_2$ concentration of about 0.01% by volume to about 10% by volume, about 0.1% by volume to about 8% by volume, or about 0.2% by volume to about 5% by volume. In the presence of this $O_2$, entrained hydrocarbons (as well as other diluent species, such as $H_2S$) input to the recycle $CO_2$ stream from the dilute hydrocarbon stream begin to oxidize within the channels of the power cycle heat exchangers as they are progressively heated.

The mixture of the recycle $CO_2$ stream with the dilute hydrocarbon stream is preferably controlled such that the total hydrocarbon content of the mixture is below the lower explosive limit (LEL), which can vary based upon the specific mixture of compounds present. Thus, in some embodiments, the mixture of the dilute hydrocarbon stream and the recycle $CO_2$ stream can have a minimum hydrocarbon concentration of at least 0.1% by volume, at least 0.5% by volume, at least 1% by volume, or at least 2% by volume, and the mixture of dilute hydrocarbon stream and the recycle $CO_2$ stream can have a maximum hydrocarbon concentration that is less than the LEL, as noted above. As a non-limiting example, a mixture comprising predominantly $CO_2$ and methane may have a maximum methane content of less than 5% by volume (e.g., about 0.01% by volume to 4.95% by volume).

It is understood that conditions for combustion require the combination of an ignition source with both of a fuel and an oxidant in a sufficient ratio. When the fuel concentration is below the LEL, the fuel to oxidant ratio is insufficient for combustion. Examples of LEL values for various hydrocarbons are as follows (with all percentages being on a volume basis): butane (1.8%); carbon monoxide (12.5%); ethane (3.0%); ethanol (3.3%); ethylene (2.7%); gasoline (1.2%); methane (5.0%); methanol (6.7%); and propane (2.1%). Based upon known LEL values, it is possible to calculate the LEL of a substantially pure hydrocarbon fuel as well as a mixed hydrocarbon fuel to ensure that that the hydrocarbon concentration is below the overall LEL for the particular material or materials being mixed with the recycle $CO_2$ stream. Since the concentration of hydrocarbons in this mixed stream is so dilute (i.e., being below the LEL of the mixture), "combustion" does not occur. This process simply oxidizes the hydrocarbons to $CO_2$ and water and produces sensible heat for the recycle $CO_2$ stream, thereby allowing the high grade heat of the turbine exhaust to be further preserved and used downstream in the heat exchanger. This additional heat also reduces the need for sources of low-grade heat used to optimize the power cycle recuperative heat exchanger train. Namely, it may not be necessary to scavenge heat from the ASU main air compressor and/or the hot gas compression cycle as non-turbine derived heat sources.

The turbine exhaust in line 112 from this process is cooled in the primary heat exchanger 120 as in a typical power production cycle configuration, such as shown in FIG. 1; however, it is then sent to a modified direct-contact cooler that has been upgraded to remove any $SO_X$ and/or $NO_X$ species arising from the dilute hydrocarbon stream (e.g., sulfate or sulfite species formed by oxidation of sulfur containing compounds, such as $H_2S$ and/or nitrate or nitrite species formed by oxidation of nitrogen). An exemplary process in this regard is described in U.S. patent application Ser. No. 15/298,975, filed Oct. 20, 2016, the disclosure of which is incorporated herein by reference. The cleaned turbine exhaust is then split into the diluting $CO_2$ fraction, the export $CO_2$ fraction, and the recycle $CO_2$ stream, and the process repeats with additional dilute hydrocarbon stream being input to the power cycle.

Figure 3:
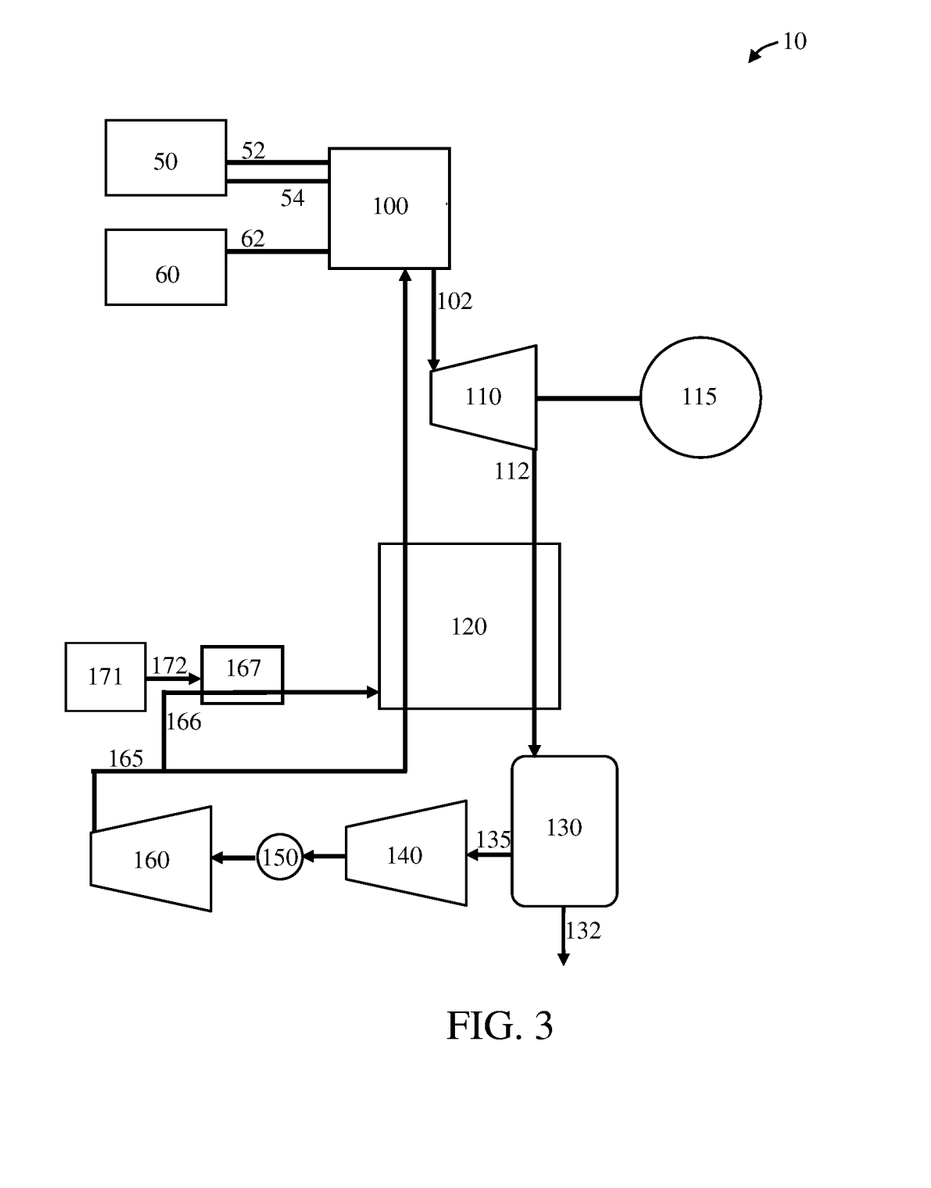
FIG. 3 is a flow diagram for a power production plant according to embodiments of the present disclosure wherein a dilute hydrocarbon stream is input to a supplemental heat exchanger.

In some embodiments, the recycle $CO_2$ stream and the dilute hydrocarbon stream can be mixed within the primary heat exchanger train once the recycle $CO_2$ stream has been heated to an appropriate temperature to facilitate the oxidation reactions. Alternatively (or in combination), the recycle $CO_2$ stream and the dilute hydrocarbon stream can be mixed within a further, separate heat exchanger. This can prevent these reactions from occurring in the lower temperature portions of the heat exchanger train where the temperature may be insufficient to provide for the oxidation reaction to occur. Accordingly, the recycle $CO_2$ stream may be input to the heat exchanger at a first temperature section, and the dilute hydrocarbon stream may be input to the heat exchanger at a second, higher temperature section wherein the temperature of the recycle $CO_2$ stream is sufficient to facilitate oxidation of the hydrocarbon compounds in the dilute hydrocarbon stream. As an example, in FIG. 3, an optional, second heat exchanger 167 (or supplemental heat exchanger) is illustrated. A side stream 166 taken from line 165 directs a portion of the recycle $CO_2$ stream through the second heat exchanger 167 to be heated by oxidation of the dilute hydrocarbon stream in line 172 that is input to the second heat exchanger 167 and is received from hydrocarbon source 171. The heated stream of recycle $CO_2$ stream is then input to the recuperator heat exchanger 120.

Figure 4:
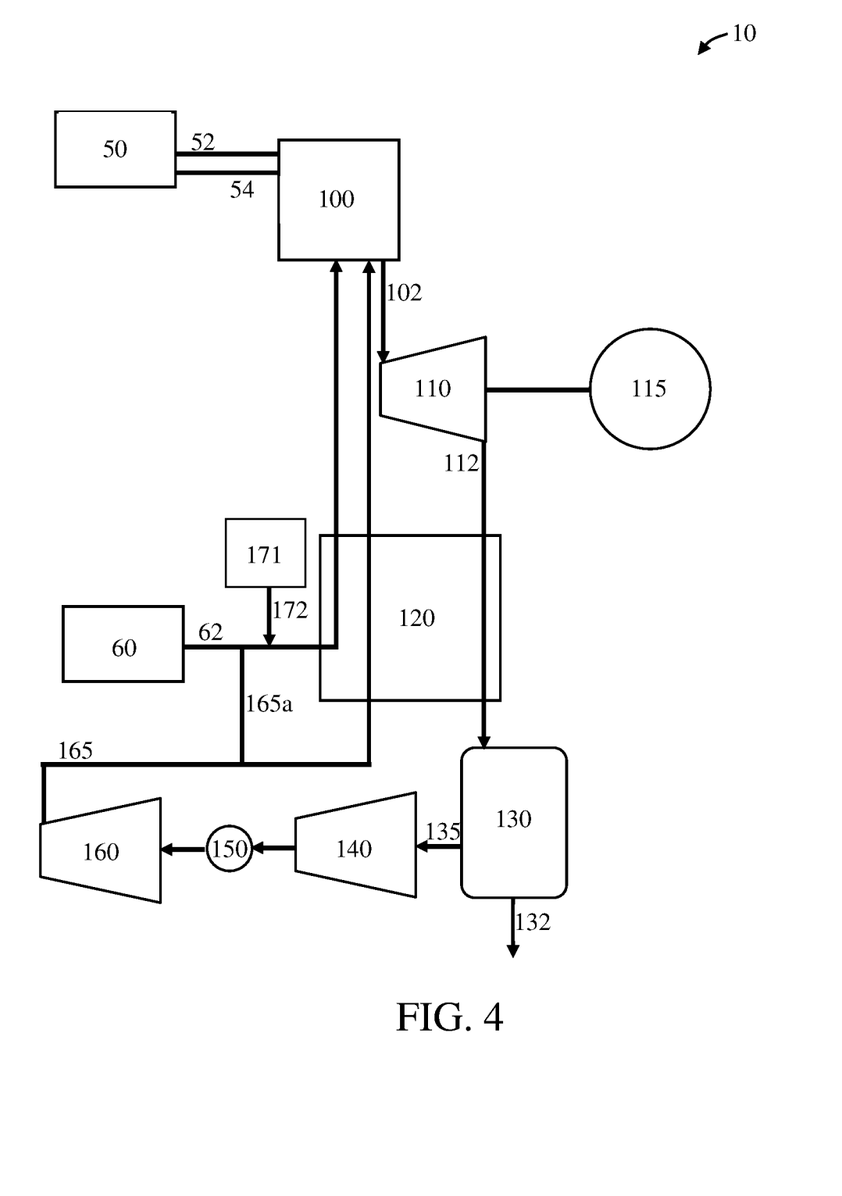
FIG. 4 is a flow diagram for a power production plant according to embodiments of the present disclosure wherein a dilute hydrocarbon stream is combined with a diluted oxidant stream.

In some embodiments, the dilute hydrocarbon stream can be introduced into the oxidant stream, which is formed of a mixture of oxygen and the diluting $CO_2$ fraction, at an appropriate location within the primary heat exchanger (or alternatively a separate, dedicated heat exchanger) such that the temperature of the combined stream is sufficient to sustain the oxidation reactions. Using the oxidant stream can serve to increase the rate (and decrease the required residence time) of these reactions due to the higher partial pressure of oxygen present in such stream relative to the partial pressure of oxygen in the recycle $CO_2$ stream. For example, referring to FIG. 4, a diluting $CO_2$ fraction in line 165a is taken from line 165 and mixed with oxidant in line 62 from the oxidant source 60 to form a diluted oxidant stream (e.g., with an $O_2/CO_2$ ratio of about 5/95 to about 40/60 or about 10/90 to about 30/70). The diluted oxidant stream may be heated by passage through the heat exchanger 120 against the cooling turbine discharge stream in line 112. All or a portion of the dilute hydrocarbon stream thus may be input to the diluted oxidant stream prior to or during passage through the heat exchanger 120. As illustrated in FIG. 4, dilute hydrocarbon from dilute hydrocarbon source 171 is passed through line 172 for input to the diluted oxidant stream in line 62 downstream from the point where $CO_2$ is added in line 165a.

In some embodiments, a portion of the oxidant stream may be introduced into the mixture of the dilute hydrocarbon stream and the recycle $CO_2$ stream either upstream of or within the primary heat exchanger train (or alternatively a separate, dedicated heat exchanger). Such addition can serve to increase the partial pressure of oxygen and increase the rate of the oxidation reactions.

In some embodiments, a catalyst may be used in the area of the heat exchanger with oxidation is to occur in order to facilitate the oxidation reactions and ensure complete oxidation. As a non-limiting example, commonly used water gas shift catalysts (e.g., various metal oxides, such as $Fe_2O_3$, $Cr_2O_3$, and CuO) may be used. Similarly, other catalysts adapted to reduce the partial pressure of $O_2$ that is required in the mixed recycle $CO_2$ stream and dilute hydrocarbon stream may be used.

Figure 5:
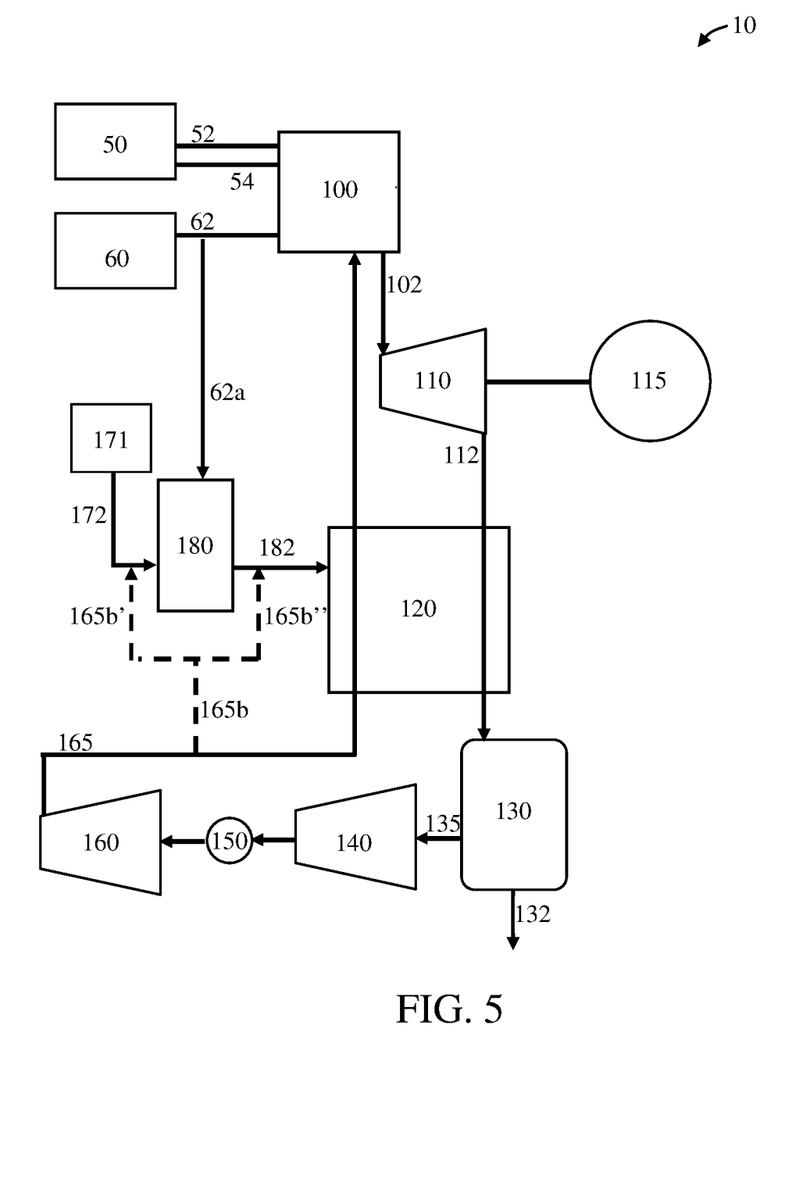
FIG. 5 is a flow diagram for a power production plant according to embodiments of the present disclosure wherein a dilute hydrocarbon stream is input to a catalytic reactor.

In addition, catalyzed oxidation can be carried out in a dedicated reactor that is separate from the primary heat exchange unit 120. As illustrated in FIG. 5, an optional oxidation reactor 180 can be used, and all or part of the dilute hydrocarbon stream can be input directly to the oxidation reactor. In particular, dilute hydrocarbon from dilute hydrocarbon source 171 is passed through line 172 to oxidation reactor 180 wherein the dilute hydrocarbon is oxidized to produce heat. Further, optionally, oxidant can be taken from line 62 (or directly from oxidant source 60) in stream 62a and can be input to the oxidation reactor 180. The oxidation of the dilute hydrocarbon stream in the oxidation reactor 180 can produce a reaction stream 182 that can have a chemistry substantially comprised of $CO_2$ and $H_2O$ (with a possible negligible amount of residual hydrocarbons). The reaction stream 182 would be expected to be increased in temperature as a result of the oxidation reaction, and the so-heated reaction stream can be input to the heat exchanger 120 at the appropriate temperature interface. In some embodiments, a portion of the recycle $CO_2$ stream (e.g., from one or both of lines 135 and 165) may be added to the dilute hydrocarbon stream and/or the reaction stream 182. As seen in FIG. 5, $CO_2$ in line 165$b$ (taken from line 165) can be input to the line 172 with dilute hydrocarbon via line 165$b'$ and/or to the reaction stream 182 via line 165$b''$. Such additions can be useful for regulating the temperature of the oxidation reaction in the oxidation reactor 180 and/or regulating the temperature of the reaction stream 182 itself before introduction to the primary recuperative heat exchanger train 120. In this manner, the dilute hydrocarbon stream can essentially be used as a low grade heat source that may be considered to be "external heat" for addition to the recuperative heat exchanger 120 that can add to or replace other sources of external heating, such as utilizing heat recuperation from the ASU and/or a hot gas recompression cycle. Such a manner of operation can be useful to improve efficiency by reducing the UA requirements of the power cycle recuperative heat exchanger train while providing additional $CO_2$ for export and further offsetting fuel demand at the power cycle combustor.

Figure 6:
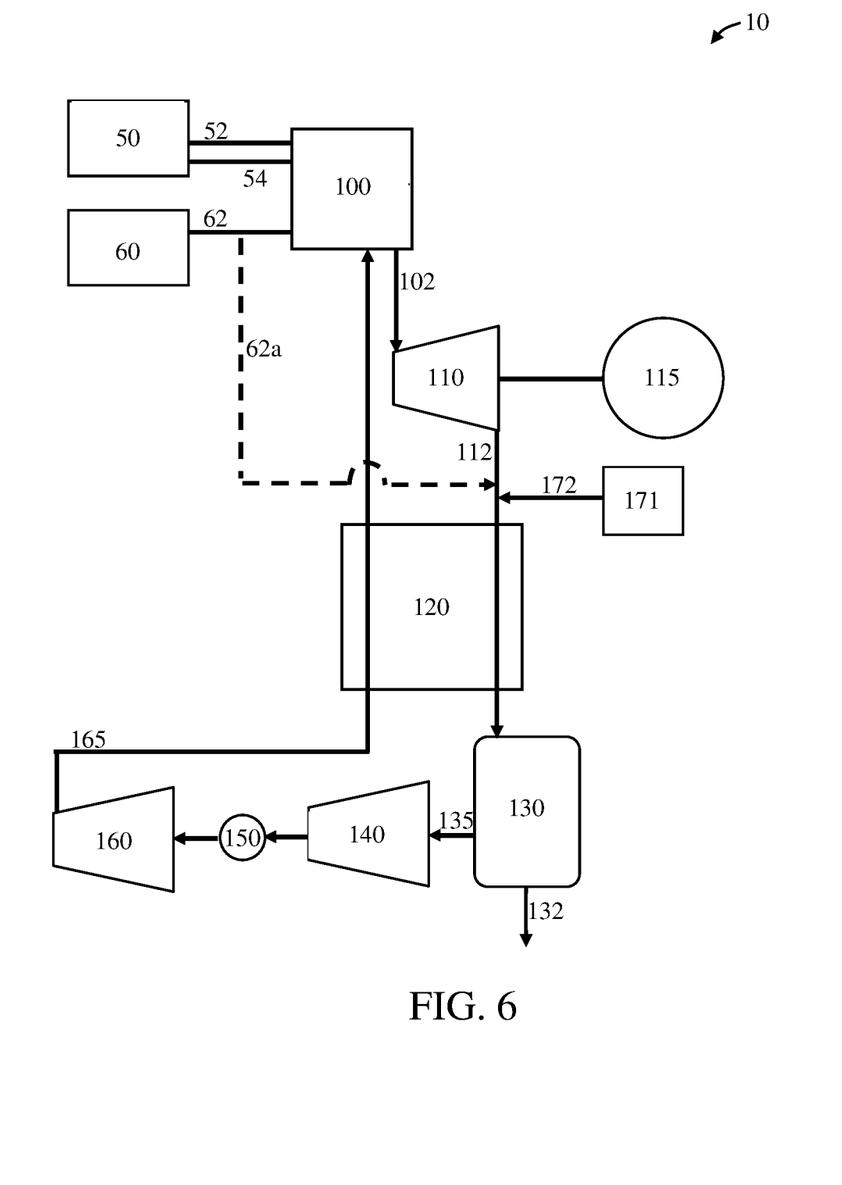
FIG. 6 is a flow diagram for a power production plant according to embodiments of the present disclosure wherein a dilute hydrocarbon stream is input to a turbine exhaust stream downstream from a turbine and upstream from a heat exchanger.

In some embodiments, the dilute hydrocarbon stream may be mixed with the turbine exhaust stream so that oxidation of the hydrocarbons can "super-heat" the turbine exhaust stream. As illustrated in FIG. 6, dilute hydrocarbon from dilute hydrocarbon source 171 can be input through line 172 directly to the turbine exhaust in line 112 upstream from the heat exchanger 120. This can serve to increase the amount of heat available for recuperation by the recycle $CO_2$ stream upon passage through the heat exchanger 120. Oxidant from the oxidant stream 62 may be input to the turbine exhaust stream in such embodiments depending upon the residual oxygen concentration in the turbine exhaust and the chemistry of the dilute hydrocarbon stream 170. Such optional embodiment is illustrated in FIG. 6 wherein oxidant in line 62$b$ is passed from line 62 (or directly from oxidant source 60) to the turbine exhaust line 112. Although oxidant line 62$a$ is shown entering turbine exhaust line 112 upstream of the point where the dilute hydrocarbon in line 172 is input, it is understood that the oxidant line 62$a$ may enter the turbine exhaust line 112 downstream of the point where the dilute hydrocarbon in line 172 is input, or the oxidant line 62$a$ may connect directly to the line 172 for mixture with the dilute hydrocarbon prior to entry to turbine exhaust line 112.

Figure 7:
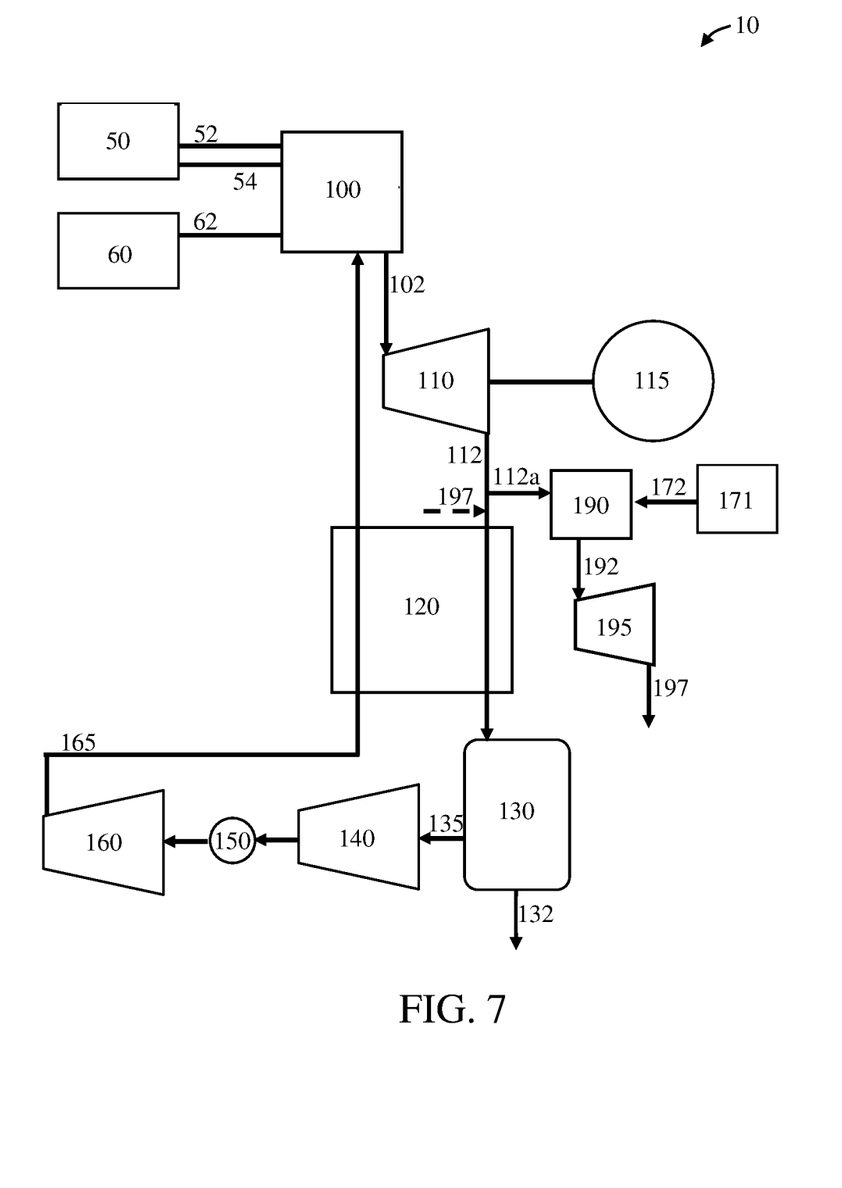
FIG. 7 is a flow diagram for a power production plant according to embodiments of the present disclosure wherein a dilute hydrocarbon stream is input to a catalytic reactor with a turbine exhaust stream and then expanded through a secondary turbine.

In further, optional embodiments, as illustrated in FIG. 7, a portion of the turbine exhaust in line 112 can be diverted in line 112$a$ to an oxidation reactor 190 (which may include one or more catalysts as noted above) to be combined with dilute hydrocarbon delivered in line 172 from dilute hydrocarbon source 171. Further, optionally, oxidant from oxidant source 60 may be input to the oxidation reactor 190. The line 112$a$ can be configured to divert a portion of the expanded $CO_2$ working fluid upstream of the recuperator heat exchanger 120 and downstream from the turbine 110. The reaction product stream in line 192 exiting the oxidation reactor 190 will be elevated in temperature above the temperature of the turbine exhaust in line 112 and can be further expanded across a further turbine 195 (i.e., a secondary turbine or a supplemental turbine) for added power generation. The turbine exhaust in stream 197 can be recombined with the turbine exhaust in line 112 prior to entry to the recuperative heat exchanger 120, may be utilized for other purposes, or may be exhausted.

In any of the embodiments described herein, the dilute hydrocarbon stream may be supplemented with another fuel in order to accommodate changes in the flow rate or composition of the dilute hydrocarbon stream. For example, a content of natural gas may be mixed with the dilute hydrocarbon stream.

The presently disclosed systems and methods are beneficial for the integration of a high efficiency power production system with low BTU fuels without necessitating changes to the basic nature of the equipment utilized (e.g., the combustor and/or turbine). The ability to utilize dilute hydrocarbon streams in this manner without the requirement for upgrading provides significant economic and process advantages, such as reducing or eliminating GPU requirements and/or increasing $CO_2$ recovery.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for power production comprising:
   carrying out a closed or semi-closed power production cycle wherein:
   $CO_2$ is circulated as a working fluid that is repeatedly compressed and expanded for power production;
   a first fuel source is combusted in a combustor to heat the working fluid after the working fluid is compressed and before the working fluid is expanded for power production; and
   a recuperator heat exchanger is used to re-capture heat of combustion for heating of the working fluid; and
   heating the working fluid with heat that is formed outside of the combustor using a second fuel source, said heating being in addition to the re-captured heat of combustion, and said second fuel source being a dilute hydrocarbon stream that is oxidized without substantial combustion to provide the heat that is formed outside of the combustor.

2. The method of claim 1, wherein a concentration of hydrocarbons in the dilute hydrocarbon stream is below a lower explosive limit (LEL) of the hydrocarbons.

3. The method of claim 1, wherein hydrocarbons in the dilute hydrocarbon stream are catalytically oxidized.

4. The method of claim 1, wherein:
   the first fuel source is combusted with oxygen in the combustor in the presence of the $CO_2$ working fluid to form an exhaust stream;
   the exhaust stream from the combustor is expanded in a turbine to produce power and form a turbine exhaust stream;
   the turbine exhaust stream is cooled in the recuperator heat exchanger;
   the turbine exhaust stream exiting the recuperator heat exchanger is purified to remove at least water from the working fluid;
   at least a portion of the working fluid is compressed in a compressor;
   at least a portion of the compressed working fluid is passed back through the recuperator heat exchanger such that the compressed working fluid is heated with heat withdrawn from the turbine exhaust stream; and
   the heated, compressed working fluid is recirculated to the combustor.

5. The method of claim 4, wherein the dilute hydrocarbon stream is added to the working fluid after the working fluid is compressed in the compressor and before the working fluid is passed back through the recuperator heat exchanger.

6. The method of claim 5, wherein hydrocarbons in the dilute hydrocarbon stream are oxidized within the recuperator heat exchanger.

7. The method of claim 5, wherein hydrocarbons in the dilute hydrocarbon stream are oxidized in a further heat exchanger configured for heat exchange with one or both of the working fluid and an oxygen stream providing the oxygen to the combustor.

8. The method of claim 4, wherein the dilute hydrocarbon stream is combined with the compressed working fluid in the recuperator heat exchanger.

9. The method of claim 4, wherein a portion of the compressed working fluid is combined with oxygen to form a diluted oxygen stream, and wherein the dilute hydrocarbon stream is combined with the diluted oxygen stream.

10. The method of claim 9, wherein the diluted oxygen stream combined with the dilute hydrocarbon stream is passed through the recuperator heat exchanger wherein hydrocarbons in the dilute hydrocarbon stream are oxidized.

11. The method of claim 9, wherein the diluted oxygen stream combined with the dilute hydrocarbon stream is passed through a further heat exchanger wherein hydrocarbons in the dilute hydrocarbon stream are oxidized.

12. The method of claim 4, wherein the dilute hydrocarbon stream is input to an oxidation reactor.

13. The method of claim 12, wherein a reaction stream exiting the oxidation reactor is input to the recuperator heat exchanger.

14. The method of claim 12, wherein a reaction stream exiting the oxidation reactor is input to a further turbine for power production.

15. The method of claim 14, wherein a portion of the turbine exhaust stream is input to the oxidation reactor so as to be included in the reaction stream that is input to the further turbine.

16. The method of claim 1, wherein the dilute hydrocarbon stream is a product of an enhanced oil recovery process.

17. A power production system comprising:
a power production unit configured for carrying out a closed or semi-closed power production cycle, said power production unit including:
a combustor configured for combustion of a first fuel in the presence of a compressed $CO_2$ working fluid;
a turbine configured for expanding the compressed $CO_2$ working fluid to provide an expanded $CO_2$ working fluid;
a compressor configured for compressing the expanded $CO_2$ working fluid to provide the compressed $CO_2$ working fluid; and
a recuperator heat exchanger configured for transferring heat from the expanded $CO_2$ working fluid leaving the turbine to the compressed $CO_2$ working fluid leaving the compressor; and
one or more inputs configured for input of a dilute hydrocarbon stream to a component of the power production unit other than the combustor.

18. The power production system of claim 17, wherein the one or more inputs is configured for input of the dilute hydrocarbon stream into the recuperator heat exchanger.

19. The power production system of claim 17, further comprising a second heat exchanger, and wherein the one or more inputs is configured for input of the dilute hydrocarbon stream into the second heat exchanger.

20. The power production system of claim 17, wherein the one or more inputs is configured for input of the dilute hydrocarbon stream into a line comprising the $CO_2$ working fluid.

21. The power production system of claim 20, wherein the one or more inputs is configured for input of the dilute hydrocarbon stream into the line downstream of the recuperator heat exchanger and upstream of the compressor.

22. The power production system of claim 17, further comprising an oxidation reactor, and wherein the one or more inputs is configured for input of the dilute hydrocarbon stream into the oxidation reactor.

23. The power production system of claim 22, wherein the oxidation reactor is a catalytic oxidation reactor.

24. The power production system of claim 22, wherein the oxidation reactor is configured for output of a reaction stream that is input to the recuperator heat exchanger.

25. The power production system of claim 22, wherein the oxidation reactor is configured for receiving a portion of the expanded $CO_2$ working fluid upstream of the recuperator heat exchanger.

26. The power production system of claim 25, further comprising a second turbine configured for receiving a reaction stream from the oxidation reactor.

* * * * *